2,711,977
Patented June 28, 1955

2,711,977

METHOD FOR IMPREGNATING SPONGE RUBBER MADE FROM FROTHED RUBBER LATEX

Paul V. Butsch, South Bend, Ind., assignor to United States Rubber Company, New York, N. Y., a corporation of New Jersey No Drawing. Application November 22, 1952,
Serial No. 322,170

2 Claims. (Cl. 117—139)

This invention relates to a method of increasing the load supporting capacity of sponge rubber made from frothed rubber latex.

It is well known to prepare sponge rubber by whipping air into a latex containing stabilizing, foaming, vulcanizing and other conventional compounding ingredients to form a froth, shaping the froth as by pouring in a mold, gelling the shaped froth, and vulcanizing the gelled froth to form so-called frothed or foam sponge rubber. The sponge rubber may then be washed with water to dissolve out residual compounding ingredients and other water-soluble materials, and dried. One of the important tests of the quality of such sponge rubber is its load carrying capacity.

I have found that the load supporting capacity of frothed rubber latex sponge may be greatly increased by treating the rubber sponge with starch and alkali-metal hydroxide.

In carrying out the present invention, the frothed latex sponge rubber is impregnated with an aqueous solution of starch and alkali-metal hydroxide and dried. While the amounts of such treating materials are not critical, in general, the starch concentration in the aqueous treating solution will be from 0.1% to 10% by weight and the alkali-metal hydroxide content will be from 10% to 40% of the weight of the starch. The amount of such treating solution retained in the rubber sponge at the time of drying will generally be from 25% to 200% of the dry sponge weight.

The invention is illustrated in the examples below, all parts and percentages referred to herein being by weight:

Example I

In this and the following examples, the rubber latex was conventionally compounded for foam sponge manufacture according to the following recipe, the various compounding ingredients being added in the form of aqueous solutions or suspensions of the concentrations indicated:

| Ingredients | Parts Wet Weight | Percent Solids |
|---|---|---|
| Rubber latex | 454 | 62 |
| Potassium oleate | 15 | 20 |
| Castor oil soap | 10 | 35 |
| Potassium ferrocyanide (Zinc ion sequestering agent) | 5 | 20 |
| Zinc diethyl dithiocarbamate (accelerator) | 8 | 45 |
| High temperature reaction product of diphenylamine and acetone (antioxidant) | 6 | 50 |
| Sensitizer (Trimene base) | 5.6 | 50 |
| Zinc oxide | 5 | 45 |
| Sulfur | 9.3 | 60 |
| Zinc salt of 2-mercapto benzo thiazole (accelerator) | 12 | 30 |

A natural rubber latex compounded according to the above recipe was whipped to a wet froth density of 100 grams per liter. Twenty parts of a 25% sodium silicofluoride slurry (gelling agent) was thoroughly mixed into the froth, and the froth was poured into a flat pan mold and permitted to gel at room temperature. After the foam had gelled, the mold was heated at 212° F. for 25 minutes to cure or vulcanize the gelled foam to sponge rubber. After curing, the sponge rubber was washed in a conventional manner by passing through a series of wringer rolls which squeezed water out of the sponge, and between these wringer rolls fresh water was constantly sprayed on the sponge rubber. After washing, a portion of the sponge rubber was treated according to the present invention by immersing the sponge in an aqueous solution of 1.4% starch and 0.6% sodium hydroxide, and squeezing and relaxing the foam several times to saturate the sponge with the starch and sodium hydroxide treating solution. The sponge was removed from the treating bath and squeezed to about 78% content of treating solution based on the dry sponge weight and was dried to substantially complete dryness in 30 minutes at 250° F., using forced air. A second portion of the sponge was similarly treated according to the present invention by impregnating with an aqueous solution of 1.4% starch and 0.6% potassium hydroxide, and dried. A third portion of the sponge was similarly impregnated with an 0.6% solution of sodium hydroxide without starch and dried. A fourth portion of the sponge was similarly impregnated with an 0.6% solution of potassium hydroxide without starch and dried. A fifth portion of the sponge was similarly impregnated with a 1.4% solution of starch without alkali-metal hydroxide and dried. A sixth portion of the sponge was not treated after washing in water, and was dried with the other portions for 30 minutes at 250° F.

The load supporting capacities of different sponges may be compared by means of a so-called "indentation or compression test." The following is a description of the indentation or compression test for sponge rubber taken from the U. S. Department of Commerce Commercial Standard 182–51 for Latex Foam Mattresses for Hospitals. "A suitable instrument shall be provided to measure the load, to the nearest pound, necessary to produce an indentation into the mattress of 25 percent of its thickness. There shall be provided a circular indentor foot with square edges, of 50 square inches in area, connected by a ball-and-socket joint to a load-measuring device (such as a scale), and mounted in such a manner that the specimen can be depressed at a rate of 25 inches per minute." The number of pounds load per 50 square inches thus necessary to compress the sponge rubber 25 percent of its thickness is called the compression resistance per 50 square inches at 25 percent deflection. The greater the compression resistance, i. e., the larger the load necessary to compress the sponge a givn percentage, the greater is the load supporting capacity of the sponge.

In the case of the first and second treated portions of the sponge according to the present invention referred to above in this example, the compression resistance was respectively, 48 and 45 pounds per 50 square inches at 25% deflection. Compression resistance tests with the third, fourth, fifth and sixth sponge portions above gave the following results, respectively, 28, 28.5, 28.5, and 28.5 pounds per 50 square inches at 25% deflection. From these results, it can readily be seen that the compression resistance of sponge treated with both the starch and alkali-metal hydroxide of the present invention is greatly increased, whereas treatment with either the starch or alkali-metal hydroxide alone does not increase the compression resistance when used in the same amounts.

Example II

A frothed latex sponge was made following the recipe of Example I using a mixture of natural and synthetic rubber latices of a ratio of natural rubber latex to butadiene-styrene copolymer synthetic rubber (GR–S) latex of 60 to 40 based on the rubber solids of the latices. The wet foam density at the time of pouring into the molds was 110 grams per liter. The foam was gelled, cured and washed as in Example I. Portions of the washed sponge were impregnated with varying amounts of an aqueous solution containing starch and sodium hydroxide according to the present invention. The amounts of treating solution retained in the sponge portions were regulated by squeeze rolls through which the sponge portions were passed after removal from the treating bath. A control portion of the sponge was not impregnated with the treating solution.

The treating solution was prepared by dispersing 10 parts of starch in warm water (90° F.–100° F.), and adding 5 parts of 40% aqueous potassium hydroxide solution slowly with stirring until a viscous mixture was obtained. One part of sodium pentachlorophenate preservative was added, followed by the addition of 600 parts of water to give a thin solution free from lumps.

The portions of the sponge rubber contained about 46%, 52%, 61%, 83%, 120%, 150%, and 185% of the impregnating solution based on the dry sponge weight. The treated sponge rubbers and the control were dried for 30 minutes at 250° F., as in Example I. Compression resistance measurements of the thus-treated sponge were 15.8, 15.9, 16.7, 17.1, 18.3, 19.4 and 19.0 pounds per 50 square inches at 25% deflection, respectively, as compared to a compression resistance measurement of 10.0 pounds per 50 square inches at 25% deflection for the untreated control portion.

*Example III*

Three sponge rubbers from a latex mixture in the ratio of 60 parts (dry weight) of natural latex to 40 parts (by weight) of GR–S latex, were produced from the recipe of Example I with wet foam densities at the time of pouring of the foam of 80, 110 and 115 grams per liter, respectively. The foams were gelled, cured and washed as in Example I. The sponge rubbers were cut in half and one-half of each sponge was impregnated with the treating solution of Example II. The treated sponge contained about 115% treating solution based on the dry weight of sponge. The treated and untreated (control) halves of the three sponges were dried for 30 minutes at 250° F. with forced air.

The compression resistance of the starch and potassium hydroxide treated sponge poured at a density of 80 grams per liter and its untreated control half were 9 and 5 pounds per 50 square inches at 25% deflection, respectively. The compression resistance of the starch-potassium hydroxide treated sponge poured at a density of 100 grams per liter and its untreated control half were 16.6 and 10 pounds per 50 square inches at 25% deflection, respectively. The compression resistance of the starch-potassium hydroxide sponge poured at a density of 115 grams per liter and its untreated control half were 26.4 and 14.6 pounds per 50 square inches at 25% deflection, respectively.

The cured latex foam sponge need not be washed with water before treatment with the starch and alkali-metal hydroxide solution of the present invention. If desired, the sponge may be dried, with or without washing in water, before being treated with starch and alkali-metal hydroxide according to the present invention. The latex compound may be frothed by chemical means, as by evolving a gas such as oxygen in the latex by decomposition of hydrogen peroxide, instead of mechanically whipping air into the latex. The gelling agent may be added to the latex before foaming, or mixed into the foam before pouring, as in the above examples, or the shaped foam without admixture with a gelling agent may be coagulated or gelled by means of a coagulant gas or by freezing, or the foam may be frozen without coagulation and then the uncoagulated frozen foam may be coagulated by means of a coagulating gas. These are known variations in frothed latex sponge manufacture. The latex for preparing sponge rubber according to the present invention may be a natural rubber latex, or a conjugated diene polymer synthetic rubber latex, or mixtures of any of the same. Such conjugated diene polymer synthetic rubber latex may be an aqueous emulsion polymerizate of one or a mixture of butadienes–1, 3 for example, butadiene-1,3, 2-methyl-butadiene-1,3 (isoprene), 2-chloro-butadiene-1,3 (chloroprene), piperylene, 2,3-dimethyl butadiene-1,3. The conjugated diene polymer synthetic rubber latex, as known, may be a mixture of one or more of such butadienes-1,3 with one or more other polymerizable compounds which are capable of forming rubbery copolymers with butadienes-1,3, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene; the alpha methylene carboxylic acids, and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of increasing the load supporting capacity of a frothed rubber latex sponge which comprises impregnating the sponge with a 0.1% to 10% weight concentration of starch in an aqueous medium which also contains 10% to 40% by weight of alkali-metal hydroxide based on the weight of the starch, the aqueous medium containing the starch and alkali-metal hydroxide being present in the sponge in amount from 25% to 200% based on the dry weight of the sponge, and drying the thus treated sponge.

2. The method of increasing the load supporting capacity of a frothed rubber latex sponge which comprises impregnating the sponge with an aqueous solution of an alkali-metal hydroxide containing 0.1% to 10% by weight of starch, said solution being present in the sponge in amount from 25% to 200% based on the dry weight of the sponge, and drying the thus treated sponge.

References Cited in the file of this patent

UNITED STATES PATENTS

| Number | Name | Date |
|---|---|---|
| 949,156 | Murray | Feb. 15, 1910 |
| 2,181,886 | Goodinan | Dec. 5, 1939 |
| 2,354,430 | Greenup et al. | July 25, 1944 |
| 2,583,183 | Marvin et al. | Jan. 22, 1952 |
| 2,613,206 | Caldwell | Oct. 7, 1952 |
| 2,635,971 | Rogers et al. | Apr 21, 1953 |

FOREIGN PATENTS

| 303,545 | Great Britain | Feb. 27, 1929 |